UNITED STATES PATENT OFFICE.

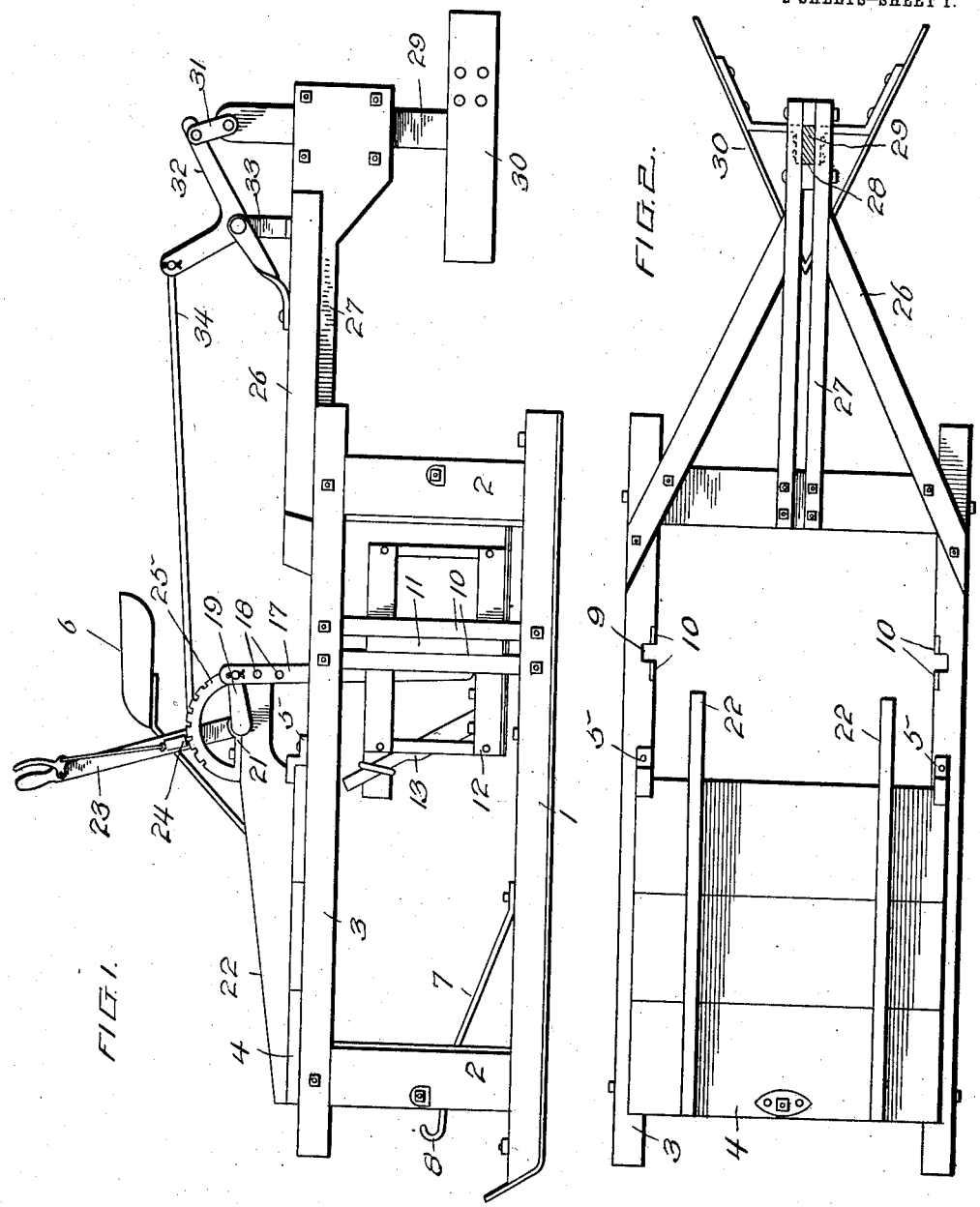

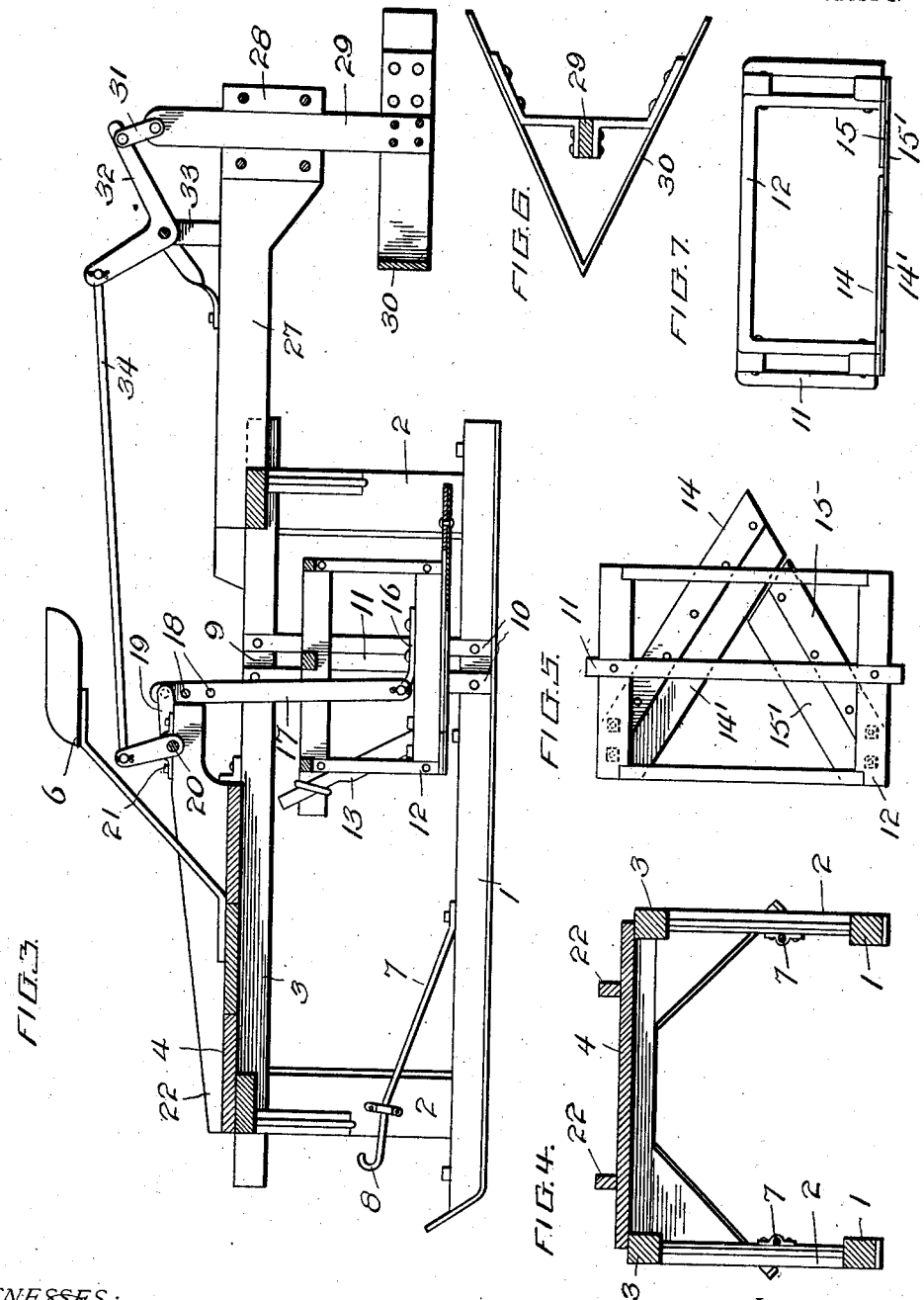

REMY A. ROUSSEL, OF LAFOURCHE CROSSING, LOUISIANA.

STUBBLE-SHAVER.

1,025,161.  Specification of Letters Patent.  Patented May 7, 1912.

Application filed July 6, 1911. Serial No. 637,167.

*To all whom it may concern:*

Be it known that I, REMY A. ROUSSEL, a citizen of the United States, residing at Lafourche Crossing, in the parish of Lafourche and State of Louisiana, have invented certain new and useful Improvements in Stubble-Shavers, of which the following is a specification.

My invention relates to improvements in stubble shavers particularly adapted for use in cultivation of sugar cane.

One object of my invention is the provision of a stubble shaver which will be comparatively light in weight to insure easy draft and which will have a novel and useful construction of knives and separator capable of operation in unison and with ease and facility.

Another object of my invention is the provision of a novel and desirable construction of cutters or knives which can be easily sharpened and which cannot catch the stubble and clog the knives.

Another object of my invention is to provide a stubble shaver having improvements in details which will insure a strong, durable and inexpensive and thoroughly practical improvement in this class of inventions.

To attain the desired objects my invention consists of a stubble shaver embodying novel details of construction and combination and arrangement of parts substantially as shown, described and claimed herein.

Figure 1 represents a side view of my complete stubble shaver with parts in position for operating. Fig. 2 represents a top plan view, with the cutting frame and cutters and the connected mechanism removed. Fig. 3 represents a vertical longitudinal sectional view of the complete machine. Fig. 4 represents a transverse sectional view, showing the platform and runners. Fig. 5 represents a top plan view of the frame carrying the knives or cutters. Fig. 6 represents a plan view of the fluke or separator for pushing aside the dirt and stubble, and Fig. 7 represents an end view of the frame carrying the cutters.

Referring by numerals to the drawings in which similar characters denote corresponding parts in all the views, the numeral 1 designates the runners suitably spaced apart and from which rise the standards 2 supporting the side rails 3, upon which rest the platform 4, made of the series of transverse strips and to retain which I prefer to use the clips or brackets 5, and upon the platform is secured the driver's seat 6, and the whole structure is drawn over the ground by means of the draft rods 7, having hooked ends 8 to receive the draft connections.

I provide each of the rails 3 with a kerf or recess 9 and with the rails and runners connect on each side the pairs of vertical guide strips 10, which with the recesses 9, provide vertical guideways for the guide strips 11, secured on each side of the knife carrying frame 12, which is of substantially rectangular shape and is braced by the inclined braces 13, and has secured to its lower portion the inclined strip 14, to which is secured the knife 14', and the inclined strip 15 to which is secured the knife 15'. It will be noted that the strip and knife 14' extend beyond or overlap the knife 15', and this is a very important feature as it prevents the cane from being caught between the knives and avoids the risk of clogging or injuring the knives, also presents the cutting edges in the most advantageous manner and permits the easy and quick detachment of the knives for the purpose of sharpening as the knives can be quickly sharpened with a file and replaced.

To the knife carrying frame is secured a bracket 16, to which is connected the lower end of the link 17, whose upper end is provided with a series of openings 18, to adjust the movement of said link and to one of the openings is connected the crank 19, on shaft 20, secured in bearings 21, carried by the longitudinally disposed strips 22, secured to the platform, and said shaft is operated by the hand lever 23, having the pawl 24, engaging the rack 25.

From this construction it will be seen that the movement of the lever lifts the link connected with the knife carrying frame and in consequence adjusts the knives and to the pair of side rails is connected the inclined frame 26, which supports the pair of longitudinal strips 27, formed with the guiding device 28, in which fits and is guided the standard 29, having at its outer end the tapered fluke or separator 30, and at its upper end the short links 31, connected to the outer arm of the bell crank lever 32, fulcrumed on the support 33, and having its other arm connected with the rod 34, which leads to the arm on the shaft, and from which construction it will be seen that when the operator moves the hand lever the knife carrying frame with its knives and the separator are moved in unison.

The operation of my improvement will be readily understood from the description and drawings and it will be apparent that the machine is drawn over the ground bringing the knives in contact with the stubble, the knives giving a shear cut and discharging the cut material which falls to the rear and is with the dirt thrown to each side of the machine.

It is evident that I provide a machine which is light in weight but possesses the necessary strength and durability; which can be easily drawn over the ground; which has a very desirable construction of knife frame and knives and which is efficient and practical in every particular.

I claim:

1. A stubble shaver, consisting of the runners, the frame mounted on the runners, the vertical guides carried by the frame, the rectangular shaped knife frame having the vertical strips fitting the guides of the frame, the knives carried by the frame, the brackets upon the frame, the adjustable link having its lower end connected to the bracket upon the knife frame, the upper end of said link having a series of openings therein, the rock shaft having a crank keyed to the upper end of the link, the hand lever for rocking the shaft, the vertical separator standard, the vertically movable separator carried thereby, the links pivoted to the upper end of the standard, the bell crank connected to said links, and the connection between the bell crank lever and rock shaft to cause the separator and knife frame to move in unison.

2. In a stubble shaver, the combination with a pair of runners, standards rising therefrom, recessed rails supported thereby, a platform mounted thereon, draft connections upon the runners, vertical guide strips connected to said side rails and runners, said guide strips forming with the recesses in the side rails guideways, guide strips sliding therein, a rectangular knife frame carried by said strips, knives overlapping each other secured to said frame, inclined strips secured to and protecting said knives, a bracket secured to the knife frame, an adjustable link connected at its lower end to the knife frame, a crank connected to the upper end of the link, longitudinally disposed strips carried by the platform having shaft bearings in which is mounted a shaft, said crank being secured upon said shaft, a lever having pawl and ratchet means for operating said shaft, an inclined frame mounted upon the main frame, longitudinal strips carried thereby, a guiding device formed thereon, a standard fitting in and guided by the guide device, a tapered separator secured upon the outer end of the standard, and means connecting the separator standard and the crank shaft for vertically adjusting the separator simultaneously with the knife frame.

3. In a stubble shaver, the combination with the runners, standards, recessed rails and platform, of vertical guide strips connected to said side rails and runners, said guide strips forming with the recesses in the side rails guideways, guide strips sliding in the guideways, a rectangular knife frame carried by the strips, knives overlapping each other secured to the frame, inclined strips secured to and protecting said knives, a bracket secured to the knife frame, an adjustable link connected at its lower end to the knife frame, a crank connected to the upper end of the link, longitudinally disposed strips carried by the platform having shaft bearings in which is mounted a shaft, said crank being secured upon said shaft, a lever having pawl and ratchet means for operating said shaft, an inclined frame mounted upon the main frame, longitudinal strips carried thereby, a guiding device formed thereon, a standard fitting in and guided by the guide device, a tapered separator secured upon the outer end of the standard, short links pivoted upon the upper end of the separator standard, a bell crank lever fulcrumed at one end upon the longitudinally extending strips and having its other end connected to the short links, and a connecting rod connecting said bell crank lever and operating lever for vertically adjusting both the separator and knife frame simultaneously.

In testimony whereof I affix my signature in presence of two witnesses.

REMY A. ROUSSEL.

Witnesses:
LÉON FOLSE,
GERARD J. HEBERT.

---

Copies of this patent may be obtained for five cents each, by addressing the "Commissioner of Patents, Washington, D. C."